United States Patent [19]

Singh et al.

[11] Patent Number: 4,895,668

[45] Date of Patent: Jan. 23, 1990

[54] CARBOXYLATED SURFACTANT-CONTAINING LUBRICANTS, PRODUCTION AND USE

[75] Inventors: Manjit Singh, Kimberley; Jeffrey Denton, Sheffield, both of England

[73] Assignee: Diversey Corporation, Mississauga, Canada

[21] Appl. No.: 293,346

[22] Filed: Jan. 4, 1989

Related U.S. Application Data

[63] Continuation of Ser. No. 15,978, Feb. 18, 1987, abandoned.

[51] Int. Cl.⁴ ............... C10M 129/40; C10M 129/16
[52] U.S. Cl. ........................................ 252/34; 252/41; 252/49.3; 252/52 A; 252/56 R; 252/356
[58] Field of Search .............. 252/34, 49.3, 52 A, 252/356, 41

[56] References Cited

U.S. PATENT DOCUMENTS

| | | | |
|---|---|---|---|
| 3,492,232 | 1/1970 | Rosenberg | 252/49.3 |
| 3,793,351 | 2/1974 | McCoy | 252/34 |
| 3,836,470 | 9/1974 | Miller | 252/34 |
| 3,836,471 | 9/1974 | Miller | 252/34 |
| 3,945,930 | 3/1976 | Sugiyama | 252/52 A |
| 4,127,490 | 11/1978 | Newkirk et al. | 252/52 A |
| 4,138,347 | 2/1979 | Crawford | 252/52 A |
| 4,215,002 | 7/1980 | Fein | 252/49.3 |
| 4,288,331 | 9/1981 | Shepley | 252/49.3 |
| 4,426,296 | 1/1984 | Shepley | 252/52 A |
| 4,491,526 | 1/1985 | Deck | 252/49.3 |
| 4,636,321 | 1/1987 | Kipp et al. | 252/49.3 |

Primary Examiner—William R. Dixon, Jr.
Assistant Examiner—E. McAvoy
Attorney, Agent, or Firm—Arnold S. Weintraub

[57] ABSTRACT

A synergistic aqueous lubricant composition which comprises one or more carboxylated surfactants and one or more non-carboxylated surfactants in combination with a soap lubricant.

15 Claims, 1 Drawing Sheet

CARBOXYLATED SURFACTANT-CONTAINING LUBRICANTS, PRODUCTION AND USE

CROSS-REFERENCE TO RELATED APPLICATIONS

This application a continuation application of co-pending U.S. patent application Ser. No. 015,978, filed Feb. 18, 1987, now abandoned, the disclosure of which is hereby incorporated by reference.

FIELD OF THE INVENTION

This invention relates to caboxylated surfactant-containing, soap lubricants and to the production and use thereof.

BACKGROUND OF THE INVENTION

Aqueous soap-based formulations are used as lubricants in numerous applications, in particular for providing slip and detergency on slat-, chain- or belt-type conveyors, for example, used for transporting items, such as bottles or cans, during a packaging operation. Generally, lubricating solutions are applied to such conveyors using pipe networks and suitable spray jets or nozzles. When used in hard water, soap-based lubricants generally require the addition of sequestering agents, such as EDTA, to reduce reaction between the soaps and the water hardness ions, e.g., $CA^{2+}$. If adequate steps are not taken, insoluble lime soaps may be formed and blockages of the lubricant distribution system may result. Lime soap dispersing agents are also commonly used so that, if the sequestrant is insufficient or exhausted, lime soap resulting will be dispersed rather than causing immediate blockages. Generally, lime soap-dispersing surfactants, which may be non-ionic, anionic or amphoteric, are included in soap-based formulations.

It has now unexpectedly been found that the above problem in the use of soap-based lubricants may be obviated and lime soap dispersion may be significantly improved by the use of a certain type of anionic surfactant in addition to those surfactants normally used in soap-based lubricants. A surprising synergism has also been noted.

The present invention relates to a synergistic aqueous soap-based lubricant composition which comprises one or more carboxylated surfactants and one or more non-carboxylated surfactants in combination with a soap.

SUMMARY OF THE INVENTION

According to an aspect of the invention, an aqueous soap-based lubricant concentrate comprises:
(i) a soap lubricant;
(ii) a carboxylated surfactant selected from the group consisting of and corresponding to the formula:

(a) $R—(OC_mH_{2m})_nOR'COOX$ wherein:
R represents a fatty group;
R' represents an alkylene group;
X represents a cationic moiety;
m represents an integer of from 2 to 4; and
n represents an integer of from 1 to 20.

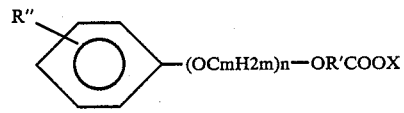

wherein
R'; X; m and n are as defined hereinabove; and
R" represents a $C_6$–$C_{20}$ alkyl group, and
(iii) a non-carboxylated surfactant; and
(iv) an aqueous diluent.

According to another aspect of the invention, an in use solution comprises the above concentrate diluted with water in a weight ratio from 3:10 to 1:1000.

DETAILED DESCRIPTION OF THE PREFERRED EMBODIMENTS

Figure 1:
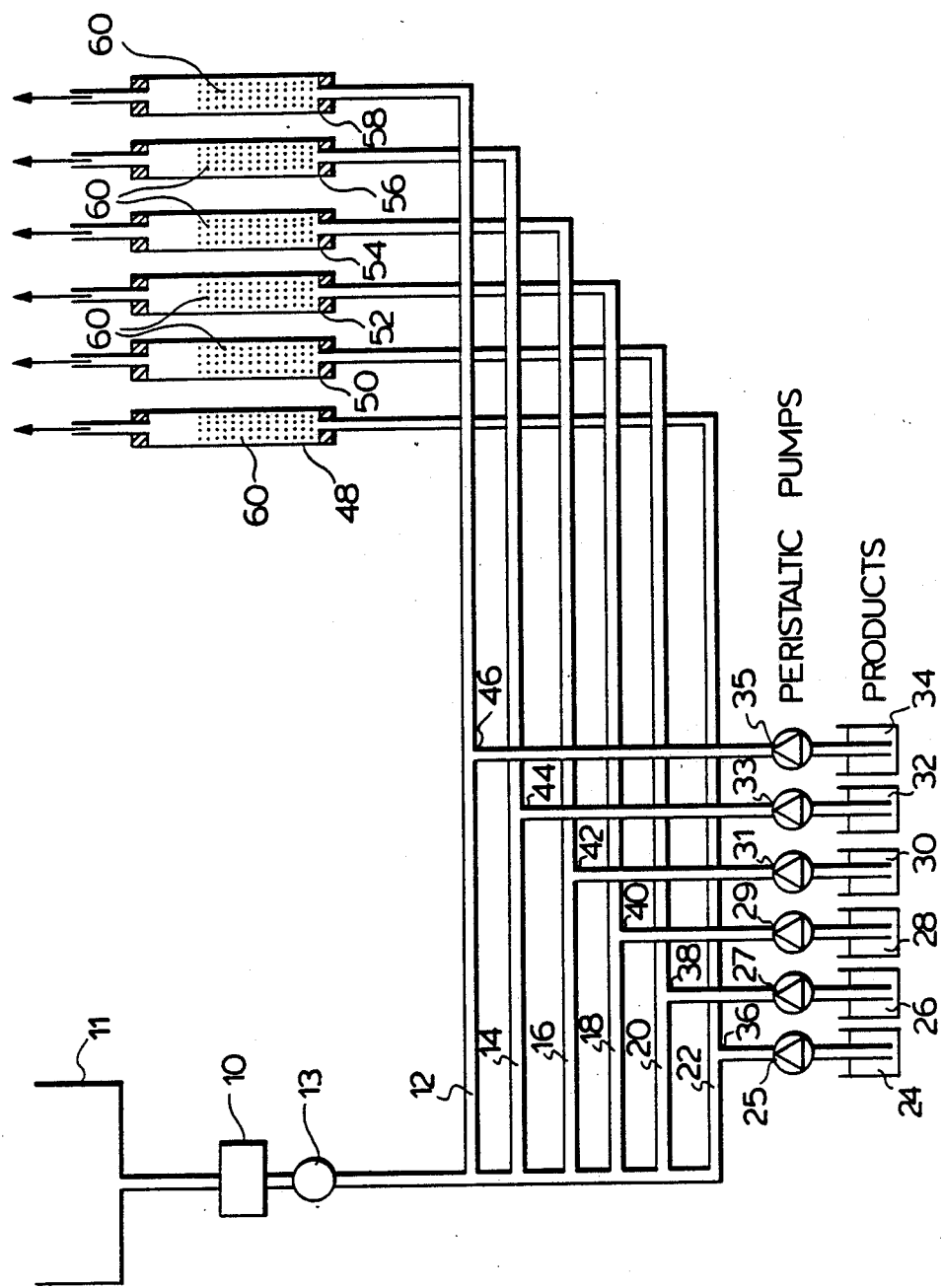
FIG. 1 is a schematic diagram of a lime soap deposition apparatus.

Generally, the carboxylated surfactant component is used in an amount of up to 20% by weight of the formulation; preferably from 0.2 to 5%. Typically, the non-carboxylated surfactant component is also present in an amount of up to 20% by weight of the formulation, preferably from 2 to 15%.

The preferred carboxylated surfactants correspond to the following general formula:

$$R—(OC_mH_{2m})_nOR'COOX \quad (I)$$

wherein:
R represents a fatty group, typically $C_{10}$–$C_{18}$; preferably oleyl;
R' represents an alkylene group, typically —CH$_2$— to —C$_3$H$_6$, preferably —CH$_2$—;
X represents a cationic moiety, typically Na$^+$, K$^+$, NH$_4^+$, H$_3$N$^+$—CH$_2$CH$_2$OH, H$_2$N$^+$(CH$_2$CH$_2$OH)$_2$ or HN$^+$(CH$_2$CH$_2$OH)$_3$, preferably Na$^+$;
m represents an integer of from 2 to 4; and
n represents an integer of from 1 to 20, and preferably 4.

Other preferred carboxylated surfactants include alkyl phenol alkoxylated, preferably ethoxylated, carboxylates, which may correspond to the following general formula:

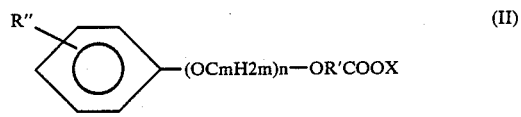

wherein
R'; X; m and an are as defined above; and
R" represents A $C_6$–$C_{20}$ alkyl group, typically $C_9H_{19}$, which is preferably in the para-position.

There may be present up to 30% by weight of the formulation, of one or more soaps. In accordance with the present invention, one or more other conventional components may also be used in conventional amounts. More particularly, up to 15% by weight of the formulation of one or more sequestrants and/or one or more solvents and/or one or more hydrotropes and/or one or more bacteriostats, and the balance is the aqueous diluent. Generally, the aqueous diluent is present in an amount ranging from between about 15% to about 97.8% by weight.

The compositions according to the present invention may be produced by mixing the components and an embodiment of the invention is so-directed.

Generally, the present compositions are diluted with water before use. This may be done in the conventional manner by premixing lubricant and water before dispensing or by directly injecting undiluted lubricant into a flowing stream and allowing the lubricant to mix slowly as it flows through the distribution pipework. An in-use solution in accordance with the present invention may typically be obtained by dilution in a weight ratio of from 3:10 to 1:1000, preferably from 1:10 to 1:500. The present invention further relates to such production.

The compositions or more usually the solutions in accordance with the present invention may be used for lubricating and/or cleaning in numerous applications. Generally, they are used in the conventional manner. They are particularly suitable for lubricating and/or cleaning slat-, chain- or belt-type conveyors and are advantageously used in food/beverage and pharmaceutical fields. Such processes are encompassed by the present invention.

The present invention may be illustrated by means of lime soap deposition tests using the test rig illustrated in FIG. 1 of the accompanying drawing. The pump 10 delivers a constant flow of 600 ml/min of water from tank 11 at a pressure of 15 psi (approx. 1.05 kg/sq cm) indicated by pressure gauge 13 into six water lines 12, 14, 16, 18, 20 and 22. Formulated product is withdrawn from respective reservoirs 24, 26, 28, 30, 32 and 34 by pumps 25, 27, 29, 31 and 33, and dosed into each respective line through "T" junctions 36, 38, 40, 42, 44 and 46; 10 ml at a time, at 2 minute intervals. Each line terminates 25 meters after the injection point at a respective column 48, 50, 52, 54, 56 and 58 containing 15 grams of stainless steel mesh 60 which acts as a lime soap absorbent.

After a given weight of product has been injected into the system, the stainless steel mesh is removed from the column and treated with a measured mixture of EDTA and sodium hydroxide to dissolve and absorb lime soap. Re-dissolved lime soap is measured as $Ca^{2+}$ ion by atomic adsorption spectroscopy.

Formulated products which have been used to test surfactants for lime soap dispersion/adhesion prevention properties by the above method are prepared to the following soap-based formulation:

| | % weight/weight |
|---|---|
| Soft water | 47.2 |
| 85% Isopropanol | 20.0 |
| Monoethanolamine | 2.8 |
| Surfactant actives | 10.0 |
| Tall oil fatty acid | 20.0 |

The above constituents are added in descending order with a thorough mixing.

TABLE 1

| Lime Soap Deposited when 400 Grams of Soap-Base Formulation Containing the Surfactants Is Tested Using the Described Method | |
|---|---|
| Surfactants | $Ca^{2+}$ Recovery |
| [Nonyl phenol ethoxylate/9 moles E.O. (ethylene oxide)] (10% w/w) | 312 ppm |
| [$C_{12}$–$C_{14}$ linear alcohol ethoxylate/ 11 moles EO] (10% w/w) | 364 ppm |
| [$C_{15}$ branched-chain alcohol ethoxylate carboxylate $NA^+$ salt] (10% w/w) | 307 ppm |
| [Oleyl alcohol ethoxylate/4 moles EO carboxylate $Na^+$ salt] (10% w/w) | 312 ppm |
| [Nonyl phenol ethoxylate/5 moles EO carboxylate $Na^+$ salt] (10% w/w) | 334 ppm |
| [Lauryl alcohol ethoxylate carboxylate monoethanolamine salt] (10% w/w) | 328 ppm |

TABLE 2

| Lime Soap Deposition from 400 Grams of Soap-Base Formulation Containing the Combinations of Surfactants when Measured with the Described Test Method | |
|---|---|
| Surfactant Combinations | $CA^{2+}$ Recovery |
| [Nonyl phenol ethoxylate/9 moles EO] (5% w/w) + [oleyl alcohol ethoxylate/4 moles EO carboxylate $Na^+$ salt] (5% w/w) | 140 ppm |
| [Nonyl phenol ethoxylate/9 moles EO](5% w/w) + [lauryl ethoxylate carboxylate monoethanolamine salt] (5% w/w) | 131 ppm |
| [Nonyl phenol ethoxylate/9 moles EO] (5% w/w) + [nonyl ethoxylate carboxylate/5 moles EO carboxylate $NA^+$ salt] (5% w/w) | 155 ppm |
| [Nonyl phenol ethoxylate/9 moles EO] (5% w/w) + [nonyl ethoxylate carboxylate/7 moles EO carboxylate $NA^+$ salt] (5% w/w) | 155 ppm |
| [Nonyl phenol ethoxylate/9 moles EO] (5% w/w) + [oleyl alcohol ethoxylate/6 moles EO carboxylate $NA^+$ salt] (5% w/w) | 148 ppm |
| $C_{12}$–$C_{14}$ linear alcohol ethoxylates/11 moles EO] (5% w/w), [oleyl alcohol ethoxylate/4 moles EO carboxylate $Na^+$ salt (5% w/w) | 159 ppm |

| Typical Formulated Lubricants | % weight/weight |
|---|---|
| Softened Water | 17.35 |
| 30% aqueous xylene sulphonic acid $Na^+$ salt | 13.00 |
| 30% aqueous EDTA tetrasodium salt | 20.00 |
| Nonyl phenol ethoxylate/9 moles EO | 5.00 |
| Isopropanol 85% | 10.00 |
| Linear alkylbenzene sulphonic acid | 4.25 |
| Oleyl alcohol ethoxylate/4 moles EO carboxylate $Na^+$ salt (25% aqueous) | 5.00 |
| Monoethanolamine | 5.40 |
| Tall oil fatty acid | 20.00 |
| Softened water | 19.4 |
| 30% aqueous xylene sulphonic acid $Na^+$ salt | 13.0 |
| 30% aqueous EDTA tetrasodium salt | 20.0 |
| Nonyl phenol ethoxylate/9 moles EO | 5.0 |
| $C_{16}$-olefin sulphonate/9 moles EO (40% aqueous) | 5.0 |
| Oleyl alcohol ethoxylate/4 moles EO carboxylate $Na^+$ salt (25% aqueous) | 5.0 |
| Isopropanol 85% | 10.0 |
| Monoethanolamine | 2.6 |
| Tall oil fatty acid | 20.0 |

The above ingredients are generally added in descending order with thorough mixing.

Although preferred embodiments of the invention have been described herein in detail, it will be understood by those skilled in the art that variations may be made thereto without departing from the spirit of the invention or the scope of the appended claims.

We claim:

1. An aqueous soap-based lubricant concentrate comprising:
   (i) a soap lubricant;
   (ii) a carboxylated surfactant of the formula selected from the following:

(a) $R-(OC_mH_{2m})_nOR'COOX$      (I)

wherein:
   R represents a fatty group;
   R' represents an alkylene group;
   X represents a cationic moiety;
   m represents an integer of from 2 to 4; and
   n represents an integer of from 1 to 20;

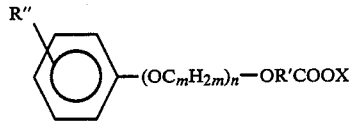 $-(OC_mH_{2m})_n-OR'COOX$      (II)

wherein
   R'; X; m and n are as defined in (a); and
   R" represents a $C_6-C_{20}$ alkyl group, and
   (c) mixtures thereof;
   (iii) a non-carboxylated surfactant; and
   (iv) an aqueous diluent.

2. A lubricant of claim 1 wherein R represents a $C_{10}-C_{18}$ fatty group; R' represents $-CH_2-$ to $C_3H_6-$; X is selected from the group consisting of $Na^+$, $K^+$, $NH_4^+$, $H_3N^+$, $-CH_2CH_2OH$, $H_2N^+(CH_2CH_2OH)_2$ and $HN^+(CH_2CHH_2OH)_3$.

3. A lubricant of claim 2 wherein R represents oleyl, R' represents $-CH_2-$, X represents $Na^+$ and n represents 4.

4. A lubricant of claim 1, wherein said carboxylated surfactant is selected from the formula I.

5. A lubricant of claim 1, wherein said carboxylated surfactant is selected from formula II.

6. A lubricant of claim 2 or 3 comprising up to 20% by weight of the carboxylated surfactant of formula I.

7. A lubricant of claim 4 or 5 comprising from 0.2 to 5% by weight of the carboxylated surfactant.

8. A lubricant of claim 1 comprising up to 20% by weight of the non-carboxylated surfactant.

9. A lubricant of claim 1 comprising from 2 to 15% by weight of the non-carboxylated surfactant.

10. A lubricant of claim 5, wherein R" represents $C_9H_{19}$ and m represents 2.

11. A lubricant of claim 5, wherein R" represents $C_9H_{19}$ in the para-position.

12. A lubricant of claim 1, wherein up to 30% by weight of the formulation is said soap lubricant.

13. A lubricant of claim 1, further comprising up to 15% by weight of a sequestrant.

14. An in-use solution which comprises a concentrate as claimed in claim 1 diluted with water in a weight ratio of from 3:10 to 1:1000.

15. A solution as claimed in claim 14 wherein the ratio is from 1:10 to 1:500.

* * * * *

UNITED STATES PATENT OFFICE
CERTIFICATE OF CORRECTION

Patent No. 4,895,668  Dated January 23, 1990

Inventor(s) Manjit Singh, Jeffrey Denton

It is certified that error appears in the above-identified patent and that said Letters Patent is hereby corrected as shown below:

Col. 2, line 57, after "m and" delete the word "an" and replace it with --n--.

Col. 2, line 58, after "represents" delete "A" and replace it with --a--.

Col. 3, line 67, before "(ethylene" delete "E.O.".

Col. 3, line 67, after "(ethylene oxide" delete "]" and replace it with ")".

Col. 4, line 9, after "carboxylate" delete "NA+" and replace it with --Na+--.

Col. 4, line 36, before "$C_{12}$" insert --[--.

Signed and Sealed this

Twelfth Day of February, 1991

*Attest:*

HARRY F. MANBECK, JR.

*Attesting Officer*   *Commissioner of Patents and Trademarks*